(12) United States Patent
Kilian-Kehr et al.

(10) Patent No.: US 7,487,177 B2
(45) Date of Patent: Feb. 3, 2009

(54) SET IDENTIFIERS FOR OBJECTS

(75) Inventors: Roger Kilian-Kehr, Darmstadt (DE);
Julien Vayssiere, Red Hill (AU)

(73) Assignee: SAP Aktiengesellschaft, Walldorf (DE)

( * ) Notice: Subject to any disclaimer, the term of this patent is extended or adjusted under 35 U.S.C. 154(b) by 802 days.

(21) Appl. No.: 10/982,774

(22) Filed: Nov. 8, 2004

(65) Prior Publication Data

US 2006/0101067 A1    May 11, 2006

(51) Int. Cl.
*G06F 7/00* (2006.01)
*G06F 17/00* (2006.01)
(52) U.S. Cl. .................................... 707/103 R; 707/7
(58) Field of Classification Search ............... 707/1–10, 707/100–14.1, 200–206; 235/462.01, 462.13
See application file for complete search history.

(56) References Cited

U.S. PATENT DOCUMENTS

| | | | | |
|---|---|---|---|---|
| 5,361,349 | A * | 11/1994 | Sugita et al. | ................... 707/8 |
| 7,015,811 | B2 * | 3/2006 | Decker et al. | .......... 340/539.22 |
| 7,231,387 | B2 * | 6/2007 | Sauermann et al. | ............ 707/4 |
| 7,267,275 | B2 * | 9/2007 | Cox et al. | ................... 235/451 |

OTHER PUBLICATIONS

Henrici, D. et al., Hash-based enhancement of location privacy for radio-frequency identification devices using varying, Mar. 14-17, 2004, IEEE, 149-153.*

Juels, A., "Yoking-proofs" for RFID tags, Mar. 14-17, 2004, IEEE, 138-143.*

RFID—Wikipedia, the free encyclopedia, "RFID", reprinted from http://en.wikipedia.org/wiki/RFID, printed on Nov. 5, 2004 (6 pages).

Howstuffworks "How Smart Labels Will Work"; "How Smart Labels Will Work"reprinted from http://www.howstuffworks.com/smart-label.htm, printed on Nov. 5, 2004 (3 pages).

Howstuffworks "How Smart Labels Will Work", "Reinventing the Bar Code", reprinted from http://electronics.howstuffworks.com/smart-label1.htm, printed on Nov. 5, 2004 (4 pages).

Howstuffworks "How Smart Labels Will Work", "Talking Tags", reprinted from http://electronics.howstuffworks.com/smart-label2.htm, printed on Nov. 5, 2004 (4 pages).

'Radio-frequency identification' [online]. Wikipedia, 2008, [retrieved on Jan. 7, 2008]. Retrieved from the Internet: <URL: http://en/wikipedia.org/w/index.php?title=Radio-frequency_identification&oldid=7255863>, 5 pages.

* cited by examiner

*Primary Examiner*—Jean B Fleurantin
(74) *Attorney, Agent, or Firm*—Fish & Richardson P.C.

(57) ABSTRACT

Set identifiers for objects are determined based on individual identifiers of the objects. A first identifier is received from a first identification tag associated with a first object. A second identifier is received from a second identification tag associated with a second object. A set identifier corresponding to a set of objects that includes the first object and the second object is determined, based on the first identifier and the second identifier. The set identifier is associated with a virtual object that corresponds to the set.

24 Claims, 8 Drawing Sheets

SET IDENTIFIERS FOR OBJECTS

TECHNICAL FIELD

This description relates to auto-identification of objects.

BACKGROUND

Radio Frequency Identification (RFID) technology, along with other auto-identification technologies, such as, for example, bar-code scanning techniques, may be used to associate a physical object with information corresponding to the physical object. Generally, the physical object is tagged with an RFID chip that includes a unique identifier for the physical object, such as, for example, a numeric or an alpha-numeric identifier. The identifier may be read from the RFID tag with an RFID tag reader, and used to identify and access stored information corresponding to the physical object. The stored information may describe, for example, the physical object or may identify processing relevant to the physical object that is to be performed. For example, the physical object may be a good being shipped, and the processing relevant to the physical object may be shipment tracking, goods monitoring, or some other supply chain management activity.

SUMMARY

In one general aspect, a first identifier is received from a first identification tag associated with a first object. A second identifier is received from a second identification tag associated with a second object. A set identifier corresponding to a set of objects that includes the first object and the second object is determined, based on the first identifier and the second identifier. The set identifier is associated with a virtual object that corresponds to the set.

Implementations may include one or more of the following features. For example, associating the set identifier with the virtual object may include determining whether the set identifier is associated with the virtual object. The virtual object may be accessed using the set identifier. The virtual object may be created, and the set identifier may be associated with the virtual object.

Determining the set identifier may include sorting the first identifier and the second identifier to produce sorted identifiers. The sorted identifiers may be combined to produce the set identifier. Combining the sorted identifiers may include concatenating the first identifier and the second identifier in sorted order. Combining the sorted identifiers also may include combining the sorted identifiers to produce a combined identifier. A hash function may be applied to the combined identifier to produce the set identifier.

The first identifier and the second identifier may be normalized to produce normalized identifiers. The first identifier and the second identifier may be filtered to produce filtered identifiers. The set identifier may be formatted into an identifier of the virtual object.

The first identifier may be received from a first radio frequency identification tag associated with the first object, and the second identifier may be received from a second radio frequency identification tag associated with the second object. The first identifier or the second identifier may be received from a radio frequency identification tag reader.

Determining the set identifier may include generating the set identifier.

In another general aspect, a system for determining a unique identifier for a group of objects includes an identification tag reader configured (i) to read a first identifier from a first identification tag associated with a first object, and (ii) to read a second identifier from a second identification tag associated with a second object. A set identifier determination system is coupled to the identification tag reader and is configured to determine a set identifier corresponding to a set of objects that includes the first and second objects, based on the first identifier and the second identifier read by the identification tag reader. A mapping system is coupled to the set identifier determination system and is configured to associate the set identifier with a virtual object that corresponds to the set.

Implementations may include one or more of the following features. For example, a data store may be coupled to the mapping system and may be configured (i) to store the virtual object, and (ii) to provide the virtual object in response to the set identifier.

The set identifier determination system may include a sorter that sorts the first and second identifiers to produce sorted identifiers and a combining system configured to combine the sorted identifiers to produce the set identifier. The combining system may be configured to concatenate the sorted identifiers in sorted order. The combining system may be configured (i) to combine the sorted identifiers to produce a combined identifier, and (ii) to apply a hash function to the combined identifier to produce the set identifier.

The set identifier determination system may include a normalizer configured to normalize the first and second identifiers, a filter configured to filter the first identifier and the second identifier, or a formatting system configured to format the set identifier into an identifier of the virtual object.

The set identifier determination system may be included in the identification tag reader.

In another general aspect, a first identifier is received from a first identification tag associated with a first object, and a second identifier is received from a second identification tag associated with a second object. A set identifier for a set of objects that includes the first object and the second object is identified, based on the first identifier and the second identifier, and the set identifier is mapped to a virtual object that corresponds to the set.

Implementations may include one or more of the following features. For example, mapping the set identifier to the virtual object may include accessing the virtual object using the set identifier, accessing a virtual object associated with the set identifier, or accessing a virtual object associated with the set identifier that indicates whether access to a resource for which the first and second objects are presented should be provided. Mapping the set identifier to the virtual object also may include accessing a virtual object associated with the set identifier that indicates whether the first and second objects should be separated, or accessing a virtual object associated with the set identifier that indicates whether the set of objects is complete.

The details of one or more implementations are set forth in the accompanying drawings and the description below. Other features will be apparent from the description and drawings, and from the claims.

DETAILED DESCRIPTION

Figure 1:
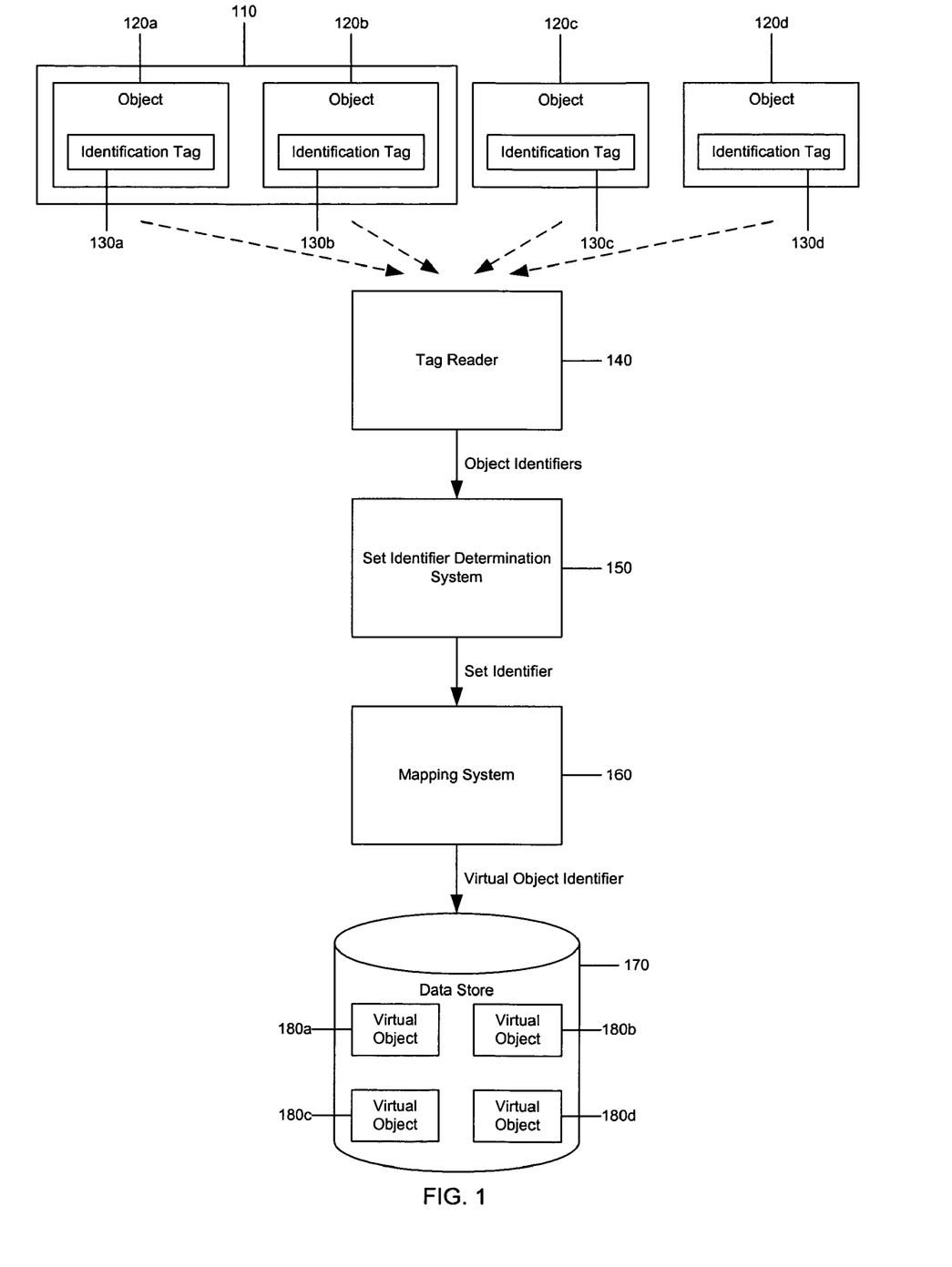
FIG. 1 is a block diagram of a system for determining an identifier of a set of objects.

Referring to FIG. 1, an identification system 100 determines a set identifier for a set 110 of objects 120a and 120b within a group of objects 120a-120d, each of which may be any object to which an identification tag may be applied. For example, the objects 120a-120d may be people, tangible goods, or products. The set identifier is determined based on identifiers of the objects 120a-120d. For example, the system 100 may ascertain a pre-defined set identifier for the set 110 of the objects 120a and 120b, or may create a new set identifier for the set 110. In the former case, for example, the system 100 may match the set identifier for the set 110 against an expected set identifier. In the latter case, the system 100 may be set up to generate the set identifier for consecutive groups of two of the objects 120a-120d.

The objects 120a-120d are associated with identification tags 130a-130d, respectively. A tag reader 140 reads identifiers from the identification tags 130a-130d. The tag reader 140 passes the identifiers to a set identifier determination system 150, which determines the set identifier for the set 110. The set identifier is passed to a mapping system 160 that identifies and accesses a virtual object associated with the set 110 from a data store 170, which includes virtual objects 180a-180d. In FIG. 1, for example, the virtual object 180a may be associated with the set 110 through the corresponding set identifier, while the virtual objects 180b-180d may correspond to other groupings of the objects 120a-120d, or to individual ones of the objects 120a-120d.

In general, the set 110 includes multiple objects with respective identifiers that are indicated by corresponding identification tags. In the implementation shown in FIG. 1, the set 110 includes the objects 120a and 120b with identification tags 130a and 130b, respectively. The set identifier of the set 110 is not indicated by a specific identification tag, but, rather, is determined from the individual identifiers of the objects 120a and 120b.

The identification tags 130a-130d supply unique identifiers for the objects 120a-120d, respectively. More particularly, the identification tags 130a-130d provide identifiers to the objects 120a-120d that, for example, uniquely identify a type of the objects 120a-120d, or uniquely identify the objects 120a-120d themselves. The identifiers typically are numerical and may be provided in a binary representation. In one implementation, the identification tags are radio frequency identification (RFID) tags.

The tag reader 140 is operable to read the identifiers from the identification tags 130a-130d. For example, the tag reader 140 may read nearby identification tags using standardized protocols. The tag reader 140 may be configured to pass the identifiers read from the tags 130a-130d to the set identifier determination system 150.

The set identifier determination system 150 is configured to generate or identify a set identifier for the set 110, based on the identifiers of the objects 120a-120d received from the tag reader 140. The set identifier determination system 150 is described further with respect to FIGS. 3 and 4. The set identifier typically is unique to the set 110, such that another set of objects typically does not have the same set identifier. The set identifier determination system 150 may be configured to pass the set identifier to the mapping system 160. In one implementation, the set identifier determination system 150 is included in the tag reader 140.

The mapping system 160 maps the set identifier received from the set identifier determination system 150 to the virtual object 180a associated with the set 110. The mapping system 160 maintains a mapping, such as, for example, a hash function, of set identifiers to virtual objects that may be used to identify a virtual object that corresponds to the set identifier received from the set identifier determination system 150. The mapping system 160 includes an entry identifying a virtual object associated with each set identifier that has been received. Because each set identifier typically is unique to one set of objects, and because each set of objects typically is associated with one virtual object, the mapping maintained by the mapping system 160 may be bijective, in that each set identifier may map to exactly one virtual object, and each virtual object may be mapped to by exactly one set identifier. A virtual object corresponding to the received set identifier is identified with the mapping, and an identifier of the virtual object may be passed to the data store, where the virtual object is stored.

The data store 170 stores the virtual objects to which set identifiers may map in the mapping maintained by the mapping system 160, such as the virtual objects 180a-180d. When the data store 170 receives an identifier of the virtual object 180a corresponding to the set 110 from the mapping system 160, the data store 170 retrieves the virtual object 180a. The identifier may identify a location in the data store 170 at which the virtual object 180a is stored.

The virtual object 180a may include information describing the set 110 or instructions identifying further processing relevant to the set 110 that is to be performed. In one implementation, the data store 170 is included in a web server, and the virtual objects 180a-180d are web pages or other electronic resources accessible from the web server. In such an implementation, the identifier of a virtual object received from the mapping system 160 is an address of the location of the virtual object, such as a uniform resource identifier (URI) or a uniform resource locator (URL) of the virtual object. In another implementation, the data store 170 may be a database of virtual objects, and the identifier of a virtual object may identify a location within the database at which the virtual object is stored or a query that may be used to retrieve the virtual object. In other implementations, the identifier of a virtual object may be a phone number or an e-mail address that may be used to access the virtual object.

Thus, as just described, set identifiers may be generated for sets of objects including multiple individual objects, based on identifiers of the individual objects. The identifiers of the individual objects may be read from identification tags associated with each of the individual objects. The identifiers of objects included in a set of objects may be combined into a single identifier that uniquely identifies the set. The set identifier is used to identify and to access a virtual object, such as, for example, a web page or another electronic resource, that provides information describing the set or instructions for processing relevant to the set. Generating set identifiers for sets of objects based on identifiers of the objects has many applications, including, for example, identification of product bundles, verification of shipment integrity in supply chain management, controlling access to protected resources, and identifying undesirable sets of objects.

Using the single identifier for the set of objects facilitates accessing information relevant to the set of objects. Typically, identifiers of individual objects may be used only to access information associated with the individual objects. Complex calculations may be necessary to identify information relevant to a set of objects based on the individual identifiers. For example, virtual objects associated with the individual identifiers may be accessed and then processed to identify information relevant to the set of objects as a whole. With the set identifier, information relevant to the set of objects may be accessed in a manner similar to how information relevant to an individual object is accessed. Therefore, only the manner in which the information to be accessed is identified needs to be modified to include generation of the set identifier to enable information relevant to sets of objects to be accessed. As a result, minimal modification of existing systems is necessary to enable accessing information relevant to sets of objects.

Thus, as should be understood from FIG. 1, a set identifier may be generated for the entire group of objects 120a-120d, or for any set of the objects 120a-120d. For example, the system 100 may be designed to generate a set identifier for every group that comes within range. As another example, the system 100 may identify a set identifier corresponding to a pre-determined set of the group of objects 120a-120d, such as the set 110, even if the objects 120a and 120b are interposed within a much larger group of objects. Other examples and implementations are discussed in more detail below.

Figure 2:
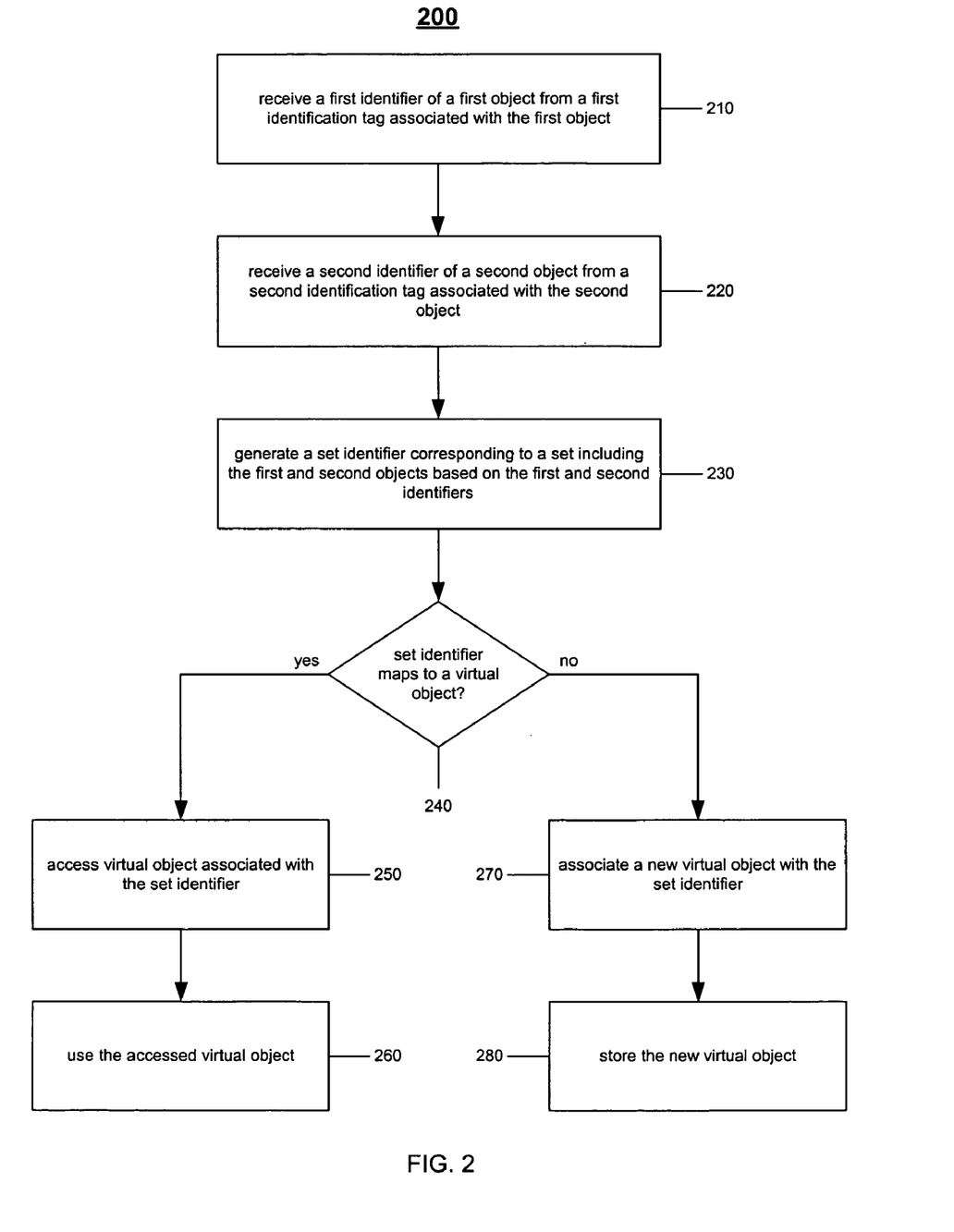
FIG. 2 is a flow chart of a process for determining and using an identifier of a set of objects.

Referring to FIG. 2, a process 200 is executed on the identification system 100 of FIG. 1 to determine an identifier for a set of objects including a first object and a second object. As described above, the generated set identifier may be used to access a virtual object associated with the set of objects, or to associate a new virtual object with the set of objects.

A first identifier of a first object is received from an identification tag associated with the first object (210). More particularly, a tag reader, such as the tag reader 140 of FIG. 1, may read an identifier from an identification tag, such as the identification tag 130a of FIG. 1, that is associated with a first object, such as the object 120a of FIG. 1. Similarly, a second identifier of a second object is received from an identification tag associated with the second object (220). For example, the tag reader may read an identifier from an identification tag, such as the identification tag 130b of FIG. 1, that is associated with a second object, such as the object 120b of FIG. 1. The tag reader may read the first and second identifiers by moving within a range in which identification tags of the first and second objects may be read.

The tag reader passes the first and second identifiers to a set identifier determination system, such as the set identifier determination system 150 of FIG. 1, which determines a set identifier for the set of objects including the first and second objects based on the first and second identifiers (230). Examples of techniques by which the set identifier determination system may generate the set identifier are described further with respect to FIG. 4.

The set identifier determination system passes the set identifier to a mapping system, such as the mapping system 160 of FIG. 1, which determines whether the set identifier maps to a virtual object (240). In other words, the mapping system determines if a locally maintained mapping of set identifiers to virtual objects includes an entry for the set identifier received from the set identifier determination system. An entry for the set identifier in the mapping implies that the set identifier has been received previously by the mapping system, which implies that a virtual object has been associated with the set identifier.

If the set identifier maps to a virtual object, then the virtual object associated with the set identifier is accessed (250). More particularly, the entry of the mapping for the set identifier is used to identify a location for the virtual object, and the virtual object is accessed from the location. For example, the mapping may identify a location for the virtual object within a data store, such as the data store 170 of FIG. 1, and the virtual object may be accessed from the location in the data store. The accessed virtual object is used (260). For example, the accessed virtual object may identify processing to be performed for the set of objects, and the processing may be performed. Alternatively, the information included in the virtual object may be used as necessary.

If the set identifier does not map to a virtual object, then the set identifier has not been received by the mapping system before, and the mapping maintained by the mapping system does not include an entry for the set identifier. As a result, a new virtual object to be associated with the set identifier is created, and the new virtual object is associated with the set identifier (270). More particularly, a new entry in the mapping is created for the set identifier. The entry maps the set identifier to an identifier of the virtual object, which may include a location at which the virtual object is to be stored. The new virtual object is stored at the location specified in the new entry (280). When the mapping system receives the set identifier in the future, the new virtual object will be accessed (250) and used (260) using the new entry.

Figure 3:
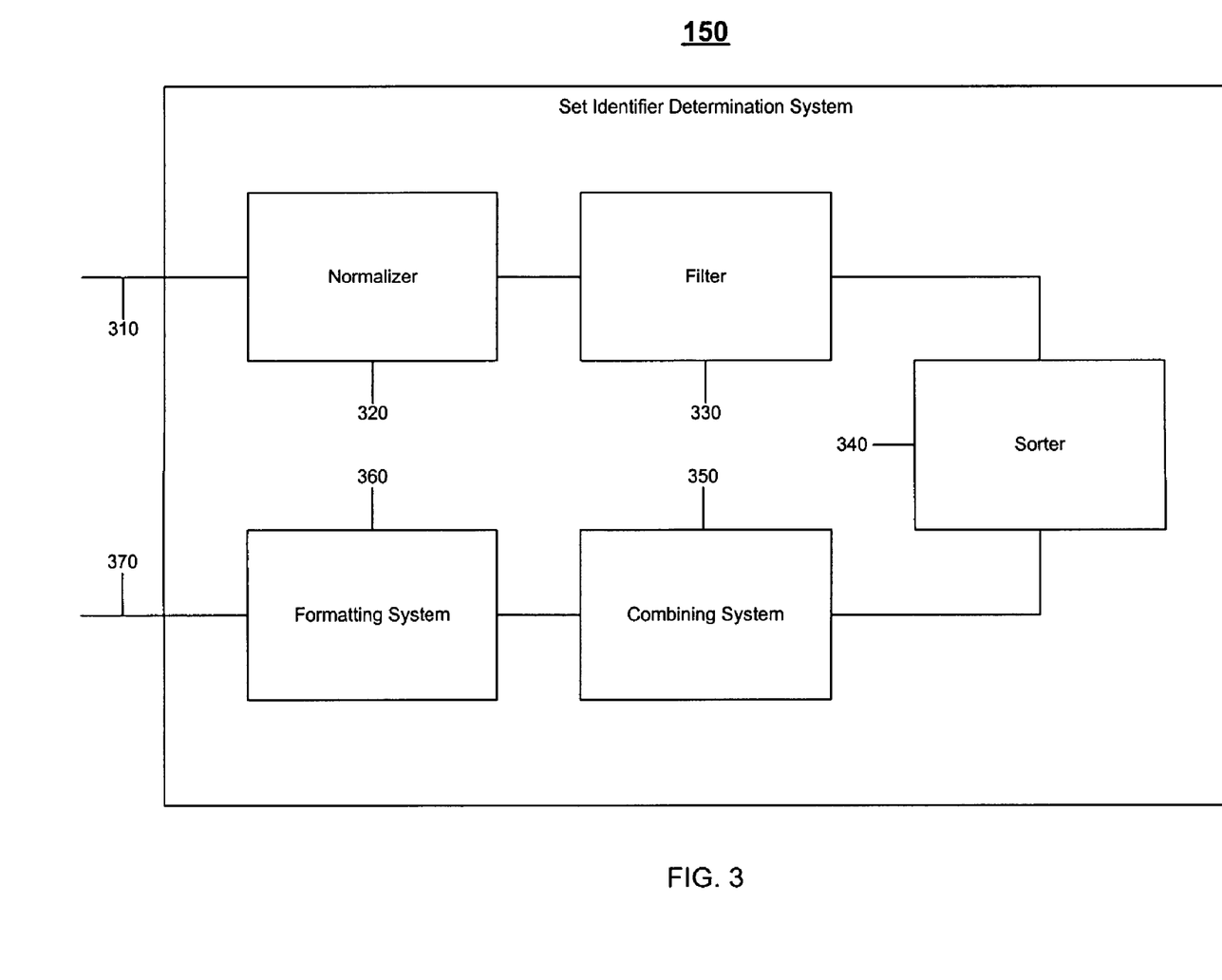
FIG. 3 is a block diagram of a set identifier determination system of the system of FIG. 1 that determines an identifier of a set of objects.

Referring to FIG. 3, a set identifier determination system 150 generates a set identifier for a set of objects based on identifiers of individual objects in the set. The set identifier determination system 150 includes an input 310, a normalizer 320, a filter 330, a sorter 340, a combining system 350, a formatting system 360, and an output 370.

Identifiers of the individual objects in the set are received by the set identifier determination system 150 over the input 310. For example, the input 310 may be connected to an identification tag reader, such as, for example, the identification tag reader 140 of FIG. 1, that reads the identifiers of the individual objects from identification tags associated with the individual objects. The identifiers are passed from the tag reader to the set identifier determination system 150 over the input 310. The input 310 may be, for example, a wired or wireless communications pathway between the tag reader and the set identifier determination system 150.

The normalizer 320 receives the identifiers of the individual objects from the input 310 and normalizes the received identifiers to produce normalized identifiers. In one implementation, normalizing an identifier includes removing one or more bits of a binary representation of the identifier. The received identifiers may have varying lengths, and normalizing the identifiers may make the received identifiers have a common length.

The filter 330 filters the set of normalized identifiers to produce filtered identifiers. The normalized identifiers may be filtered such that duplicative identifiers are removed. The normalized identifiers also may be filtered to remove identifiers that are unnecessary and to keep identifiers that are relevant to the operation of a system that includes the set identifier determination system 150.

The sorter 340 sorts the filtered identifiers to produce sorted identifiers. The sorter 340 orders the previously unordered identifiers according to certain ordering criteria. In one implementation, the sorter 340 may order the filtered identifiers such that a consistent relationship between all pairs of the sorted identifiers is maintained. For example, the filtered identifiers may be sorted such that, for all pairs of identifiers, a first identifier of a pair appearing before a second identifier of the pair indicates that the first identifier is less than the second identifier. As another example, the filtered identifiers may be sorted such that, for all pairs of identifiers, a first identifier of a pair appearing before a second identifier of the pair indicates that the first identifier is greater than the second identifier.

The combining system 350 combines the sorted identifiers into a combined identifier. In one implementation, the combined identifier is created by concatenating the sorted identifiers in sorted order. In-another implementation, the combined identifier is created by applying a hash function to the result of concatenating the sorted identifiers in sorted order. For example, a cryptographic hash function, such as the MD4 message digest security algorithm, the MD5 message digest security algorithm, the secure hash algorithm (SHA1), and the 32-bit cyclic redundancy checking algorithm (CRC32), may be applied to the concatenated identifiers.

The formatting system 360 formats the combined identifier into a formatted set identifier. The set identifier is formatted such that the formatted set identifier may be used to access a virtual object associated with the set of objects whose identifiers were received over the input 310. For example, the set identifier may be formatted to indicate the location of the virtual object.

The formatted set identifier created by the formatting system 360 is passed from the set identifier determination system 150 over the output 370. The output 370 may be connected to a mapping system, such as the mapping system 160 of FIG. 1, that accesses a virtual object associated with the formatted set identifier, or that associates a new virtual object with the formatted set identifier. The formatted set identifier is passed from the set identifier determination system 150 over the output 370, which may be a wired or wireless communications pathway.

Figure 4:
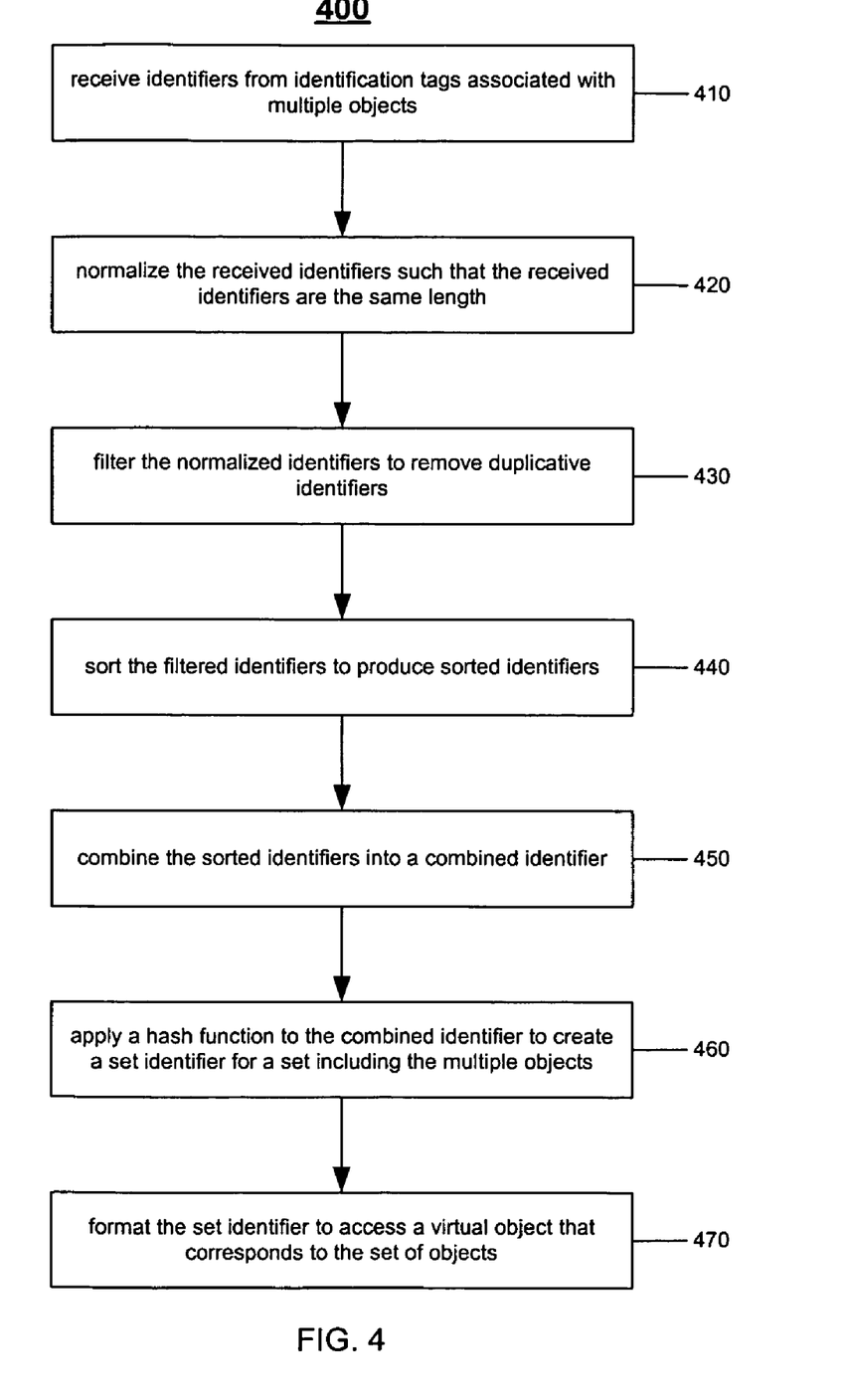
FIG. 4 is a flow chart of a process for determining a set identifier based on identifiers of individual objects.

Referring to FIG. 4, a process 400 is used to generate a set identifier for a set of objects from which individual identifiers are received. The process 400 is executed by a set identifier determination system, such as the set identifier determination system 150 of FIGS. 1 and 3. Identifiers of individual objects in the set of objects are processed to produce an identifier for the set that typically is distinct from set identifiers of other sets of objects.

The process 400 begins when the set identifier determination system receives identifiers from identification tags associated with multiple objects (410). The multiple objects comprise the set of objects for which the set identifier is generated with the process 400. The identifiers may be received from a tag reader, such as the tag reader 140 of FIG. 1, that reads the identifiers from the identification tags. The tag reader passes the identifiers to the set identifier determination system for processing.

More particularly, the set identifier determination system normalizes the received set identifiers (420). The received identifiers may be normalized with a normalizer of the set identifier determination system, such as the normalizer 320 of FIG. 3. Normalizing an identifier may include, for example, removing one or more bits of a binary representation of the identifier. For example, parts of the identifier that do not function to identify uniquely the object from which the identifier was read may be removed. More particularly, parts of the identifier that identify a type of the identifier or of the object, or parts of the identifier that identify a manufacturer of the object or of the tag from which the identifier is read, may be removed. The received identifiers may be normalized such that the received identifiers are all of the same length. Having normalized identifiers facilitates comparison and processing of the identifiers. More particularly, normalized identifiers may be compared easily to one another for sorting and other processing.

The set identifier determination system filters the normalized identifiers to produce filtered identifiers (430). The normalized identifiers may be filtered with a filter of the set identifier determination system, such as the filter 330 of FIG. 3. Filtering the normalized identifiers may include, for example, removing duplicative identifiers. For example, the identifiers received from the multiple objects may uniquely identify types of the multiple objects instead of the multiple objects themselves. If the multiple objects include more than one object of a particular type, then the normalized identifiers may include two identical identifiers. The identical identifiers may be filtered such that the filtered identifiers include only one of the identical identifiers.

Filtering the normalized identifiers also may include removing identifiers that are not relevant to the operation of a system that includes the set identifier determination system. For example, the normalized identifiers may include indications of a type of the identifiers or of objects associated with the identifiers. More particularly, an identifier may include information that indicates that the identifier is an identifier of an object included in a shipment, of a particular type of object, or of a person. In implementations where the set identifier determination system 150 is used in systems that track objects in shipments, identifiers that are not related to objects in a shipment may be removed.

The set identifier determination system sorts the filtered identifiers to produce sorted identifiers (440). The filtered identifiers may be sorted with a sorter of the set identifier determination system, such as the sorter 340 of FIG. 3. Sorting the filtered identifiers may include ordering the previously unordered identifiers according to certain ordering criteria such that a consistent relationship between all pairs of the sorted identifiers is maintained. Sorting the identifiers ensures that a single set identifier is generated for a set of objects, regardless of the order in which identifiers of individual objects in the set are received. If the identifiers were not sorted, several different set identifiers may be created for a single set of objects, depending on the order in which the identifiers are received, which may lead to inconsistencies and inaccuracies in how the set of objects are handled.

The set identifier determination system combines the sorted identifier to produce a combined identifier (450). The sorted identifiers may be combined with a combining system of the set identifier determination system, such as the combining system 350 of FIG. 3. Combining the sorted identifiers may include, for example, concatenating the sorted identifiers in sorted order such that a first identifier ordered before a second identifier appears in the combined identifier before the second identifier.

The set identifier determination system may apply a hash function to the combined identifier to produce the set identifier for the multiple objects from which individual identifiers were received (460). The hash function may be applied with a combining system of the set identifier determination system, such as the combining system 350 of FIG. 3. For example, the set identifier determination system may apply a cryptographic hash function, such as the MD4 message digest security algorithm, the MD5 message digest security algorithm, the secure hash algorithm (SHA1), and the 32-bit cyclic redundancy checking algorithm (CRC32), to the combined identifier.

The set identifier determination system may apply the cryptographic hash because the format of the combined identifier may prevent the combined identifier from being useful in identifying and accessing a virtual object associated with the set of objects. In one implementation, the length of the combined identifier is the combined length of the sorted identifiers, so the length of the combined identifier depends on the number of identifiers of objects that are received. Therefore, combined identifiers for different sets of objects may be of different lengths, and identifiers of different lengths may not be used to identify and access a single set of virtual objects. Applying a hash function to a combined identifier of any length creates a set identifier of a fixed and short length that does not depend on the number of objects in the set of objects. In other words, set identifiers for sets of objects of varying sizes are of a fixed and short length. As a result, set identifiers for sets of objects of varying sizes may be used easily to access a common set of virtual objects.

Cryptographic hash functions may be used to shorten and to standardize set identifiers because those hash functions effectively do not have collisions such that combined identifiers for two different sets of objects do not map to the same set identifier with the hash function. In such cases, the set identifiers created with the hash function effectively are unique. The particular cryptographic hash function that is used is chosen based on the relative number of collisions produced by the hash function. For example, the SHA1 algorithm typically has a very low number of collisions and is chosen in most implementations. The MD5 algorithm also may have a relatively low number of collisions.

The set identifier determination system formats the set identifier to produce a formatted set identifier (470). The set identifier may be formatted with a formatting system of the set identifier determination system, such as the formatting system 360 of FIG. 3. The set identifier is formatted to access a virtual object that corresponds to the set of objects. For example, the set identifier may be formatted into an identifier of a location of the virtual object such that the set identifier may be used to access the virtual object. Alternatively or additionally, the set identifier may be formatted such that a mapping system, such as the mapping system 160 of FIG. 1, may use the formatted set identifier to identify and access a virtual object associated with the formatted set identifier. If a virtual object is not associated with the formatted set identifier, the mapping system may create a new virtual object for the set of objects and associate the formatted set identifier with the new virtual object.

The above described techniques for creating identifiers for sets of objects based on identifiers of individual objects in the set has many applications. For example, when products are sold as part of a bundle, a set identifier may be created for the bundle based on identifiers of the products included in the bundle. For example, three books may be sold together as a single bundle of products, and each of the three books may have an identification tag that includes an identifier for the associated book. The identifier for the bundle may be the set identifier generated from the identifiers of the three books such that a separate identifier does not need to be assigned to the bundle and such that a separate identification tag corresponding to the separate identifier does not need to be put on the bundle. As a result, the bundle of products may be offered for sale more quickly, and time and money may be saved by not having to purchase and install additional identification tags for product bundles.

As another example, set identifiers may be used to check the integrity of a shipment that includes multiple products. For example, prior to shipping, a set identifier for the shipment may be generated from identifiers of the multiple products included in the shipment. A set identifier for the shipment also may be calculated at various points after shipping to verify the integrity of the shipment. Because a set identifier typically corresponds to only one set of individual object identifiers and individual objects, the set identifier for the shipment implicitly identifies the objects in the shipment and indicates whether the shipment currently includes only those products originally included in the shipment. More particularly, if the set identifier generated before shipping matches a set identifier generated after shipping, then no products have been removed from or added to the shipment in the time between the two set identifiers were generated. On the other hand, if the two set identifiers differ, then at least one product has been removed from or added to the shipment in the time between the two set identifiers were generated.

Set identifiers may be calculated for the shipment in a non-intrusive manner because tag readers may read identification tags of the products of the shipment without opening a container in which the products are being shipped. More particularly, the tags may be read through the container without accessing the products inside the container. Therefore, an individual calculating the set identifier as the products are shipped only needs to know the set identifier calculated before the products were shipped to determine whether products have been removed from or added to the shipment.

A specific application for this technique of verifying shipment integrity may be for baggage handling at airports. More particularly, a set identifier may be calculated for a set of bags to be put on a flight as the bags are checked-in at a ticket counter. A set identifier for the set of bags also may be calculated when the bags are put on the flight to verify that no bags have been added or removed after the bags were checked-in.

Figure 5:
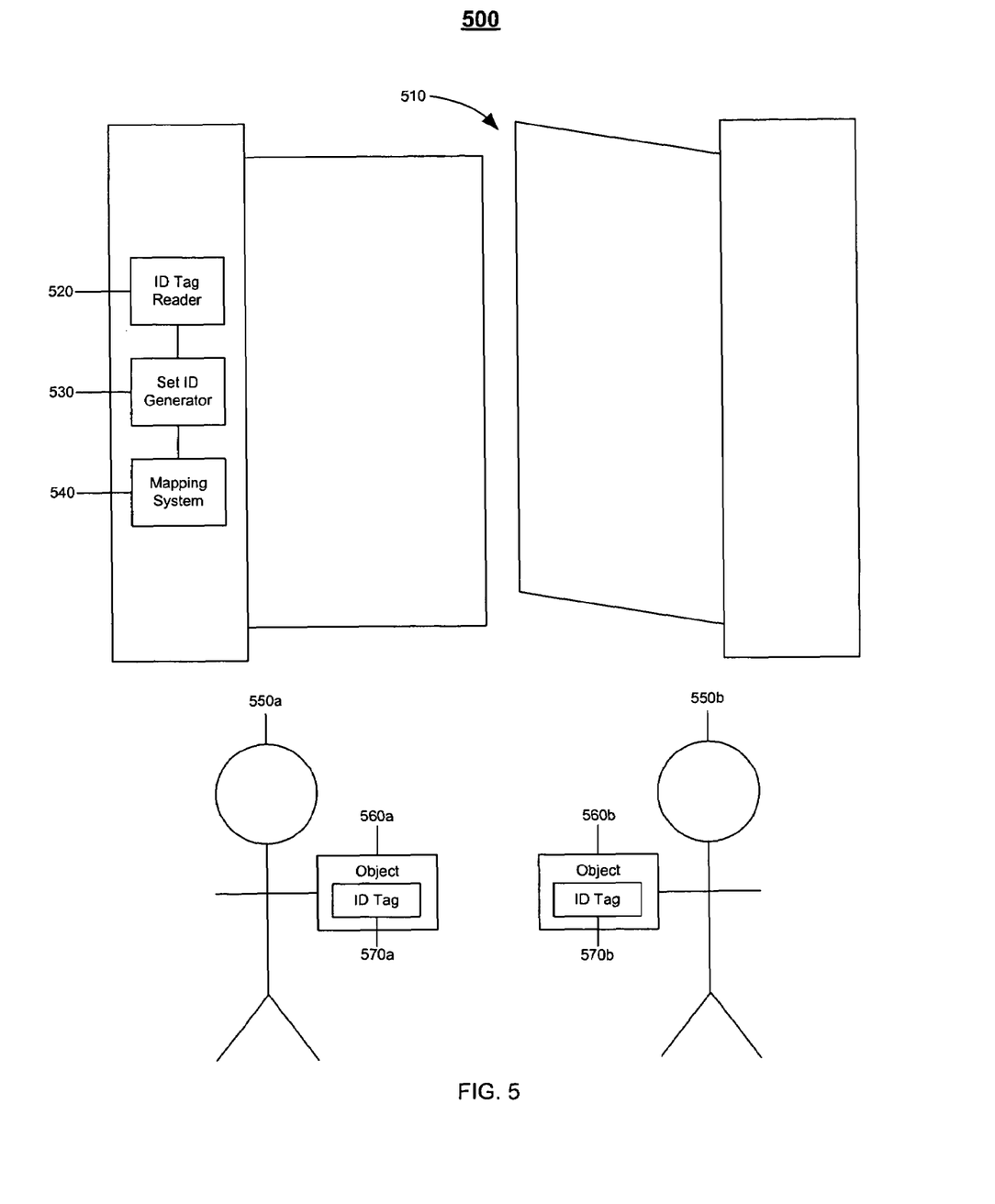
FIG. 5 is a block diagram of a system for providing access to a resource based on an identifier determined for a set of presented objects.

FIGS. 5-8 describe other applications for a set identifier that is based on individual object identifiers. Referring to FIG. 5, a security system 500 may be used to determine whether access to a resource should be provided based on objects presented to an access control device 510 for the resource. The access control device 510 includes an identification tag reader 520, a set identifier determination system 530, and a mapping system 540. People 550*a* and 550*b* present objects 560*a* and 560*b* with identification tags 570*a* and 570*b* to the access control device 510 to gain access to the resource.

In general, the security system 500 requires that multiple appropriate objects be presented to the access control system 510 before allowing access to the protected resource. Because a set identifier typically corresponds to only one set of individual object identifiers and corresponding individual objects, a set identifier generated for a set of objects presented to the access control device 510 indicates whether the presented objects are the multiple appropriate objects necessary to access the protected resource.

The access control device 510 limits access to a resource to people that present an appropriate combination of objects, as indicated by the identifiers of the objects. For example, the access control device 510 may be a gate that limits access to a restricted location through the gate. The gate may open only when an appropriate combination of objects are presented to the gate. As another example, the access control device 510 may be a safe or some other container for an object that may be accessed only when an appropriate combination of objects are presented.

The objects 560*a* and 560*b* are similar to the objects 120*a*-120*d* of FIG. 1 and are objects that may be presented to the access control device 510 to gain access to the protected resource. The objects 560*a* and 560*b* may be keys or other identification devices that may indicate collectively that the people 550a and 550b are allowed to access the protected resource. The objects 560a and 560b include tags 570a and 570b, respectively, which are similar to the tags 130a-130d of FIG. 1. The identification tag reader 520 is similar to the identification tag reader 140 of FIG. 1 and may read identifiers from the identification tags 570a and 570b. identifiers are passed to the set identifier determination system 530 that is similar to the set identifier determination system 150 of FIG. 1. The set identifier determination system 530 creates a set identifier based on the identifiers received from the identification tag reader 520.

The generated set identifier is passed to the mapping system 540, which is similar to the mapping system 160 of FIG. 1. The mapping system 540 maps the received set identifier to a virtual object that indicates whether access to the resource monitored by the access control device 510 should be allowed. In one implementation, the mapping system 760 maintains two virtual objects, and the received set identifier maps to one of the two virtual objects. One of the virtual objects indicates that access should be allowed, and the other virtual object indicates that access should not be allowed. The mapping system 540 signals for the access control device 510 to allow or restrict access to the protected resource based on the virtual object that is associated with the received set identifier. As such, only one lookup of a virtual object corresponding to a single set identifier is necessary to determine whether access to the protected resource should be allowed.

In some implementations, the mapping system 540 is located away from the access control device 510, for example, at an external security station that monitors the access control device 510. In such implementations, the set identifier generated by the set identifier determination system 530 may be detected by eavesdroppers of communications between the set identifier determination system 530 and the mapping system 540. However, identification of the objects presented to the access control gate 510 from the set identifier determination system may be computationally difficult. In other words, though a set identifier that causes the access control device 510 to permit access to the protected resource may be known, the combination of objects corresponding to the known set identifier may be difficult to identify.

In some implementations of the security system, the people 550a and 550b may be associated with identification tags, and the objects 560a and 560b, may only be associated with the people 550a and 550b, respectively. An appropriate combination of objects for the access control device 510 to allow access may be a person and the person's associated object. For example, when the person 550a presents the object 560a to the access control device 510, as indicated to the access control device 510 through receipt of identifiers from identification tags associated with the person 550a and the object 560a, access may be allowed. On the other hand, access may not be allowed if the person 550b presents the object 560a to the access control device 510, because the identifier of the person 550a is not presented, and, optionally, because the identifier of the person 550b is presented. In other words, particular people may be required to present particular objects to the access control gate 510 in order to be given access to the protected resource. In case of theft or loss of one of a tag of an object associated with a person and a tag associated with the person, access is not allowed because both tags must be presented to gain access.

Figure 6:
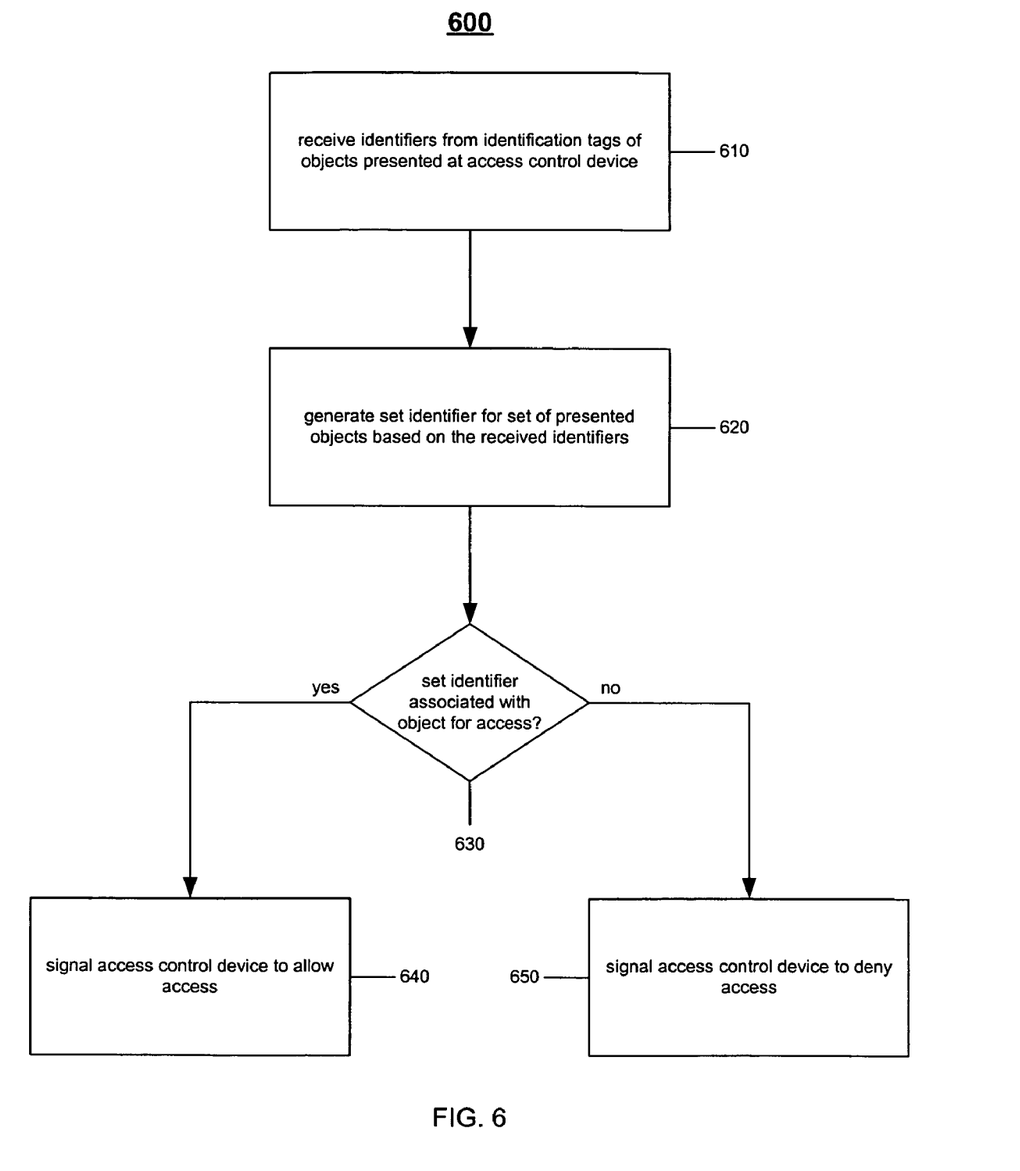
FIG. 6 is a flow chart of a process for providing access to a resource based on an identifier determined for a set of presented objects.

Referring to FIG. 6, a process 600 is executed by the security system 500 of FIG. 5 to control an access control device that restrict access to a protected resource. Identifiers from identification tags associated with objects presented to the access control device are read, and a set identifier is created for the set of the presented objects. The set identifier is used to determine whether access to the protected resource should be allowed or denied, and the access control device acts accordingly.

A tag reader at the access control device, such as the tag reader 520 of FIG. 5, receives identifiers from identification tags associated with objects presented to the access control device (610). The received identifiers are passed to a set identifier determination system, such as the set identifier determination system 530 of FIG. 5, which determines a set identifier based on the received identifiers of the presented objects (620). For example, the set identifier may be generated according to the process 400 of FIG. 4.

The set identifier is passed to a mapping system, such as the mapping system 540 of FIG. 5, which determines whether the set identifier is associated with a virtual object that indicates whether access to the protected resource should be allowed (630). In some implementations, the mapping system includes two types of virtual objects: virtual objects that indicate that access should be allowed, and virtual objects that indicate that access should not be allowed. The mapping system maintains a mapping that associates set identifiers virtual objects of the two types. The mapping is used to identify a virtual object that corresponds to a set identifier received from the set identifier determination system.

The virtual object may be retrieved from a data store, such as the data store 170 of FIG. 1, to determine the type of the virtual object. Association of a set identifier with a virtual object that indicates that access should be allowed indicates that the set of objects whose identifiers were used to create the set identifier is an appropriate combination of objects for access to be allowed. In one implementation, if the mapping does not include an entry for a set identifier, then it may be assumed that the set of objects is not appropriate and that access should not be allowed.

The mapping may be a hash function or some other function that maps a set identifier to a virtual object for allowing access when the corresponding set of objects is appropriate for allowing access, and that maps a set identifier to a virtual object for denying access when the corresponding set of objects is not appropriate for allowing access. The mapping may be specified manually, such that particular set identifiers map to appropriate virtual objects before or during execution of the process 600.

The set identifier determination system may be configured to generate particular set identifiers to facilitate the manual specification of the mapping from set identifiers to virtual objects. For example, the set identifier determination system may be configured to produce set identifiers that end in a particular digit when the set identifiers represent sets of objects appropriate for allowing access.

If the set identifier is associated with a virtual object for allowing access, then the mapping system signals the access control device to allow access to the protected resource (640). For example, in implementations where the access control device is a gate, the mapping system may signal the gate to open. In implementations where the access control device is a safe, the mapping system may signal the safe to unlock and open. If the set identifier is not associated with a virtual object for allowing access, then the mapping system signals the access control device to deny access to the protected resource (650). For example, the mapping system may signal the access control device to remain closed and locked, thereby restricting access to the protected resource.

Figure 7:
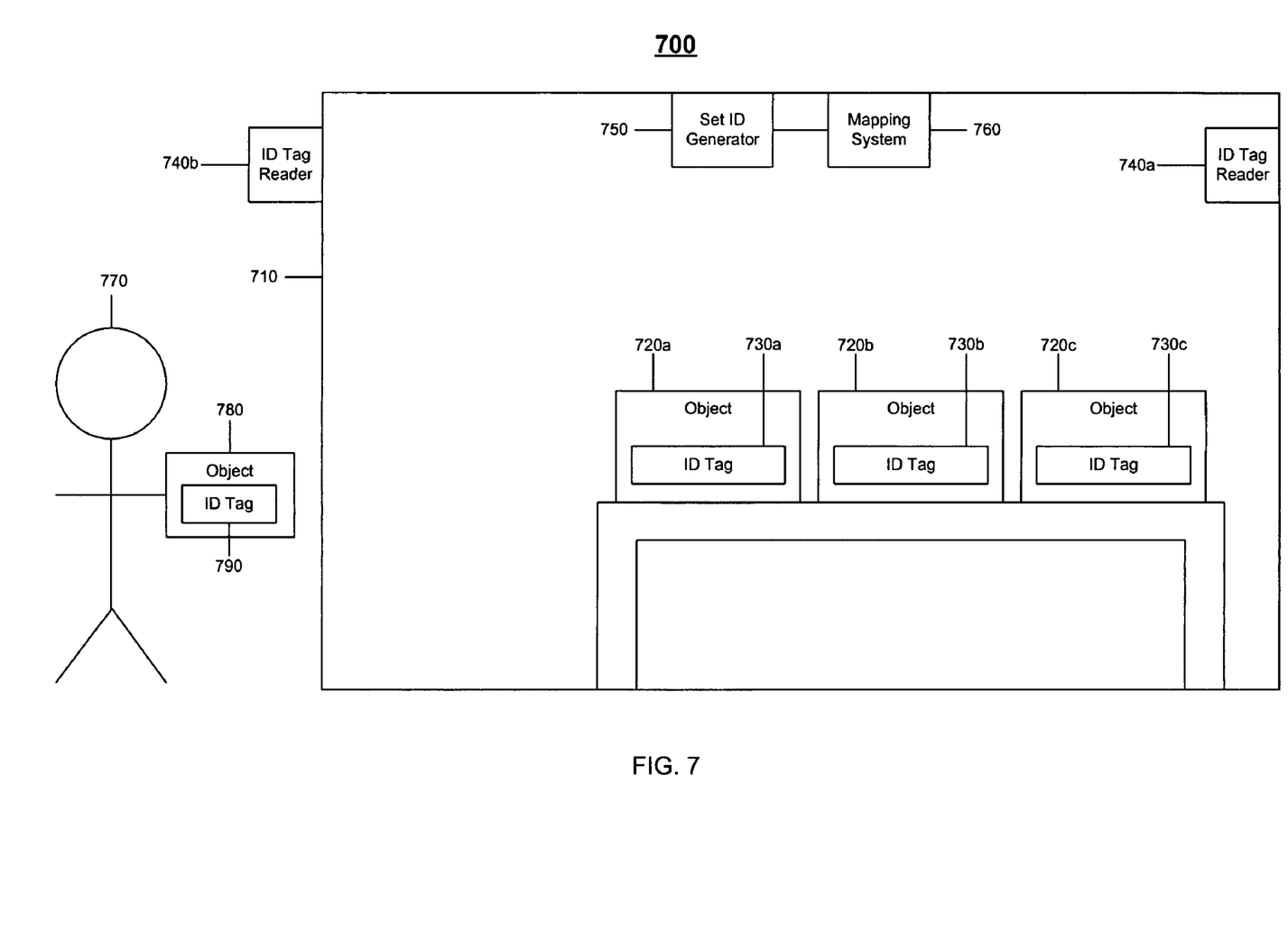
FIG. 7 is a block diagram of a system for identifying undesirable sets of objects.

Referring to FIG. 7, a system 700 signals for separation of sets of undesirable objects and prevents sets of undesirable objects from being formed within a room 710. Objects 720a-720c that are tagged with identification tags 730a-730c, respectively, are found within the room 710. An identification tag reader 740a is located within the room 710, and an identification tag reader 740b is found outside of the room. Identification tags read by the tag readers 740a and 740b are passed to a set identifier determination system 750, which communicates with a mapping system 760. A person 770 located outside of the room 710 may attempt to transport an object 780 with an identification tag 790 into the room 710.

The room 710 is a room in which objects that include identification tags are found. For example, the room 710 may be a room in which chemicals are stored. As another example, the room 710 may be a room in which tapes including backup information for a file server or another system for which backups are maintained. Undesirable sets of objects are sets of objects that should not be found in the room 710 at the same time. For example, when chemicals are stored in the room 710, an undesirable set of objects may be a set of chemicals that may react dangerously when close together. The system 700 prevents the dangerous set of chemicals from being stored together in the room 710, which may prevent potential damage to the room 710. As another example, an undesirable set of objects may include a file server and one or more backup tapes including backup information for the file server. Such a set is undesirable because both the file server and the backup tapes would be damaged if the contents of the room 710 were damaged, which would prevent the contents of the file server from being restored from the backup tapes. Undesirable sets of objects may include objects found both inside and outside of the room 710.

The objects 720a-720c are similar to the objects 120a-120d of FIG. 1 and are objects that may be found within the room 710. The objects 720a-720c include tags 730a-730c, respectively, that are similar to the tags 130a-130d of FIG. 1. Similarly, the object 780 and the associated identification tag 790, which are found outside the room 710, also are similar to the objects 120a-120d and the tags 130a-130d of FIG. 1. Each of the identification tag readers 740a and 740b is similar to the identification tag reader 140 of FIG. 1 and may read identifiers from the identification tags 730a-730c and 790. More particularly, the tag reader 740a reads identifiers from identification tags found inside the room 710, such as the identification tags 730a-730c, and the tag reader 740b reads identifiers from identification tags found outside the room 710, such as the identification tag 790.

The identifiers are passed to the set identifier determination system 750, which is similar to the set identifier determination system 150 of FIG. 1. The set identifier determination system 750 creates a set identifier for each possible set of multiple identifiers that may be created out of the identifiers received from the identification tag readers 740a and 740b. For example, if a first identifier, a second identifier, and a third identifier are received, the set identifier determination system 750 creates four set identifiers: one based on the first and second identifiers, one based on the first and third identifiers, one based on the second and third identifiers, and one based on the first, second, and third identifiers.

The generated set identifiers are passed to the mapping system 760, which is similar to the mapping system 160 of FIG. 1. The mapping system 760 maps received set identifiers to virtual objects that indicate whether the set of objects corresponding to the identifiers on which the received set identifiers are based represents an undesirable set of objects. In one implementation, the mapping system 760 maintains two virtual objects, and all of the received set identifiers map to one of the two virtual objects. One of the virtual objects indicates that a set of objects corresponding to a received set identifier is an undesirable set of objects that should be separated, and the other virtual object indicates that the set of objects is not undesirable and does not need to be separated.

If the mapping system 760 maps a set identifier to a virtual object indicating an undesirable set of objects, an alarm indicative of the undesirable set may be generated. In addition, if one or more of the objects in the undesirable set of objects is found outside the room 710, those objects may be prevented from entering the room 710 by, for example, locking a door to the room 710, or by otherwise preventing the door from being opened.

Figure 8:
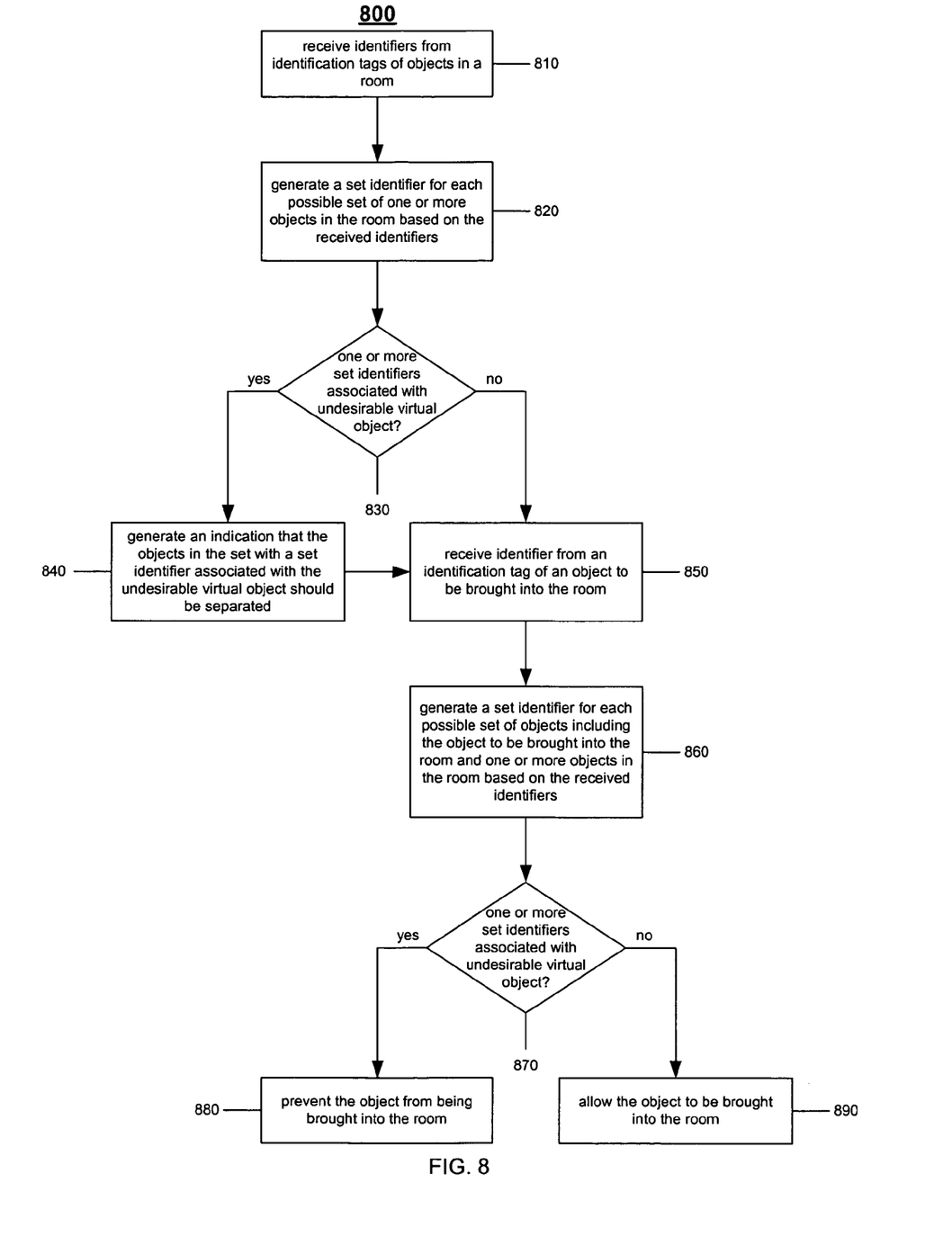
FIG. 8 is a flow chart of a process for identifying undesirable sets of objects.

Referring to FIG. 8, a process 800 is executed by the system 700 of FIG. 7 to identify and signal for the separation of undesirable sets of objects. Identifiers from identification tags associated with objects inside and outside of a room are read and used to create set identifiers for each possible set of objects including two or more of the objects inside and outside of the room. The set identifiers are used to determine whether an undesirable set of objects is present within the room, or would be present within the room if an object outside of the room were brought into the room. Indications of the undesirable sets are generated such that the undesirable sets may be dismantled or prevented from being formed.

A tag reader inside the room, such as the tag reader 740a of FIG. 7, receives identifiers from identification tags associated with objects in the room, such as the identification tags 730a-730c of the objects 720a-720c of FIG. 7 (810). The received identifiers are passed to a set identifier determination system, such as the set identifier determination system 750 of FIG. 7, which generates a set identifier for each possible set of two or more objects in the room based on the received identifiers (820). More particularly, the set identifier determination system generates a set identifier based on each possible combination of identifiers received from the tag reader. Each possible combination of identifiers corresponds to a possibly undesirable set of objects, and the corresponding set identifier is used to determine whether the possibly undesirable set of objects is, in fact, undesirable. Each of the set identifiers may be generated according to the process 400 of FIG. 4.

The generated set identifiers are passed to a mapping system, such as the mapping system 760 of FIG. 7, which determines whether one or more of the generated set identifiers are associated with an undesirable virtual object (830). In some implementations, the mapping system includes two types of virtual objects: undesirable virtual objects and desirable virtual objects. The mapping system maintains a mapping that associates set identifiers virtual objects of the two types. The mapping is used to identify a virtual object that corresponds to a set identifier received from the set identifier determination system. The virtual object may be retrieved from a data store, such as the data store 170 of FIG. 1, to determine the type of the virtual object. Association of a set identifier with an undesirable virtual object indicates that the set of objects whose identifiers were used to create the set identifier is an undesirable set of objects.

The mapping may be a hash function or some other function that maps a set identifier to an undesirable virtual object when the corresponding set of objects is undesirable and that maps a set identifier to a desirable virtual object when the corresponding set of objects is not undesirable. The mapping may be specified manually such that particular set identifiers map to appropriate virtual objects before or during execution of the process 800. The set identifier determination system may be configured to generate particular set identifiers to facilitate the manual specification of the mapping from set identifiers to virtual objects. For example, the set identifier determination system may be configured to produce set identifiers that end in a particular digit when the set identifiers represent undesirable sets of objects.

If one or more of the set identifiers is associated with an undesirable virtual object, then the mapping system generates an indication that objects in the sets of objects corresponding to the one or more set identifiers should be separated (840). In other words, the mapping system generates an indication that at least one undesirable set of objects is located within the room. For example, an alarm indicating that at least one undesirable set of objects is found within the room may be generated. In one implementation, the set identifier determination system and the mapping system maintain state information such that objects corresponding to a set identifier that is associated with an undesirable virtual object may be identified easily. For example, the set identifier determination system may maintain a mapping of set identifiers to object identifiers on which the set identifiers are-based. When the, mapping system identifies a set identifier that is associated with an undesirable virtual object, the mapping system may pass that set identifier back to the set identifier determination system such that the identifiers of the objects in the undesirable set of objects may be identified with the mapping maintained by the set identifier determination system. The objects corresponding to those identifiers may be identified and separated to dismantle the undesirable set of objects. In one implementation, dismantling the undesirable set of objects includes moving at least one of the objects outside of the room.

If no set identifiers are associated with undesirable virtual objects, then a tag reader outside the room, such as the tag reader 740*b* of FIG. 7, may receive an identifier from an identification tag associated with an object outside of the room, such as the identification tag 790 of the object 780 of FIG. 7 (850). The object outside the room may represent an object to be brought into the room. The received identifier is passed to the set identifier determination system, which generates a set identifier for each possible set of objects that includes at least one of the objects already in the room and the object to be brought into the room, based on the identifiers received from the tag readers inside and outside of the room (860). The set identifiers are generated similarly to how the set identifiers are generated earlier, i.e., based only on the identifiers of the objects in the room (820).

The generated set identifiers are passed to the mapping system, which determines whether one or more of the generated set identifiers is associated with an undesirable virtual object (870). Such a determination may be made according to the mapping maintained by the mapping system, as was done previously.

If one or more of the set identifiers is associated with an undesirable virtual object, then the object to be brought into the room forms an undesirable set of objects with one or more of the objects already in the room. As such, the object outside of the room is prevented from being brought into the room (880). For example, a door to the room may be locked or otherwise prevented from being opened, such that the object outside the room may not be brought into the room. If no set identifiers are associated with undesirable virtual objects, then the object to be brought into the room does not form an undesirable set of object with one or more of the objects already in the room. As such, the object outside of the room is allowed to be brought into the room (890). For example, a door to the room may be unlocked and opened.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method comprising:
  receiving a first identifier from a first identification tag associated with a first object;
  receiving a second identifier from a second identification tag associated with a second object;
  determining a set identifier corresponding to a set of objects that includes the first object and the second object, based on the first identifier and the second identifier, further comprising
    sorting the first identifier and the second identifier to produce sorted identifiers,
    combining the sorted identifiers to produce a set identifier, further comprising combining the sorted identifiers to produce a combined identifier, and
    applying a hash function to the combined identifier to produce the set identifier;
  associating the set identifier with a virtual object that identifies processing to be performed to the set; and
  outputting a result of the processing.

2. The method of claim 1 wherein associating the set identifier with the virtual object comprises determining whether the set identifier is associated with the virtual object.

3. The method of claim 2 further comprising accessing the virtual object using the set identifier.

4. The method of claim 2 further comprising:
  creating the virtual object; and associating the set identifier with the virtual object.

5. The method of claim 1 wherein combining the sorted identifiers comprises concatenating the first identifier and the second identifier in sorted order.

6. The method of claim 1 further comprising normalizing the first identifier and the second identifier to produce normalized identifiers.

7. The method of claim 1 further comprising filtering the first identifier and the second identifier to produce filtered identifiers.

8. The method of claim 1 further comprising formatting the set identifier into an identifier of the virtual object.

9. The method of claim 1 wherein:
receiving a first identifier from a first identification tag comprises receiving a first identifier from a first radio frequency identification tag associated with the first object; and
receiving a second identifier from a second identification tag comprises receiving a second identifier from a second radio frequency identification tag associated with the second object.

10. The method of claim 9 wherein:
receiving the first identifier comprises receiving the first identifier from a radio frequency identification tag reader; and
receiving the second identifier comprises receiving the second identifier from a radio frequency identification tag reader.

11. The method of claim 1 wherein determining the set identifier comprises generating the set identifier.

12. A system for determining a unique identifier for a group of objects, the system comprising:
an identification tag reader comprising an input device configured (i) to read a first identifier from a first identification tag associated with a first object, and (ii) to read a second identifier from a second identification tag associated with a second object;
a set identifier determination system coupled to the identification tag reader and comprising:
a first processor configured to determine a set identifier corresponding to a set of objects that includes the first and second objects, based on the first identifier and the second identifier read by the identification tag reader,
a sorter configured to sort the first and second identifiers to produce sorted identifiers, and
a combining system configured (i) to combine the sorted identifiers to produce a set identifier, further comprising combining the sorted identifiers to produce a combined identifier, and (ii) to apply a hash function to the combined identifier to produce the set identifier; and
a mapping system coupled to the set identifier determination system and comprising a second processor configured to associate the set identifier with a virtual object that corresponds to the set.

13. The system of claim 12 further comprising a data store coupled to the mapping system and configured (i) to store the virtual object, and (ii) to provide the virtual object in response to the set identifier.

14. The system of claim 12 wherein the combining system is configured to concatenate the sorted identifiers in sorted order.

15. The system of claim 12 wherein the set identifier determination system includes a normalizer configured to normalize the first and second identifiers.

16. The system of claim 12 wherein the set identifier determination system includes a filter configured to filter the first identifier and the second identifier.

17. The system of claim 12 wherein the set identifier determination system includes a formatting system configured to format the set identifier into an identifier of the virtual object.

18. The system of claim 12 wherein the set identifier determination system is included in the identification tag reader.

19. A computer program product, tangibly embodied in a machine readable storage device, the computer program product comprising instructions that, when read by a machine, operate to cause a data processing apparatus to:
receive a first identifier from a first identification tag associated with a first object;
receive a second identifier from a second identification tag associated with a second object;
identify a set identifier for a set of objects that includes the first object and the second object, based on the first identifier and the second identifier, by
sorting the first identifier and the second identifier to produce sorted identifiers,
combining the sorted identifiers to produce a set identifier, further comprising combining the sorted identifiers to produce a combined identifier, and
applying a hash function to the combined identifier to produce the set identifier; and
map the set identifier to a virtual object that corresponds to the set.

20. The computer program product of claim 19 wherein mapping the set identifier to the virtual object comprises accessing the virtual object using the set identifier.

21. The computer program product of claim 19 wherein mapping the set identifier to a virtual object comprises accessing a virtual object associated with the set identifier.

22. The computer program product of claim 19 wherein mapping the set identifier comprises accessing a virtual object associated with the set identifier that indicates whether access to a resource for which the first and second objects are presented should be provided.

23. The computer program product of claim 19 wherein mapping the set identifier comprises accessing a virtual object associated with the set identifier that indicates whether the first and second objects should be separated.

24. The computer program product of claim 19 wherein mapping the set identifier comprises accessing a virtual object associated with the set identifier that indicates whether the set of objects is complete.

* * * * *